Feb. 3, 1959 G. USTIN 2,872,505
ELECTRICAL CONNECTOR
Filed April 22, 1955

INVENTOR
GEORGE USTIN
Richard A. Craig
ATTORNEY

United States Patent Office 2,872,505
Patented Feb. 3, 1959

2,872,505

ELECTRICAL CONNECTOR

George Ustin, Verona, N. J., assignor to Buchanan Electrical Products Corporation, Hillside, N. J., a corporation of New Jersey Application April 22, 1955, Serial No. 503,199

10 Claims. (Cl. 174—87)

This invention relates generally to electrical connectors and more specifically to what is commonly termed a preinsulated splice cap.

It is known to strip the insulation from the ends of two or more conductors and to connect the exposed conductors together by inserting them into a sleeve of malleable material such as copper and then crimping the sleeve against the conductors to produce a good electrical and mechanical connection. Such a sleeve is commonly known as a splice cap.

No known insulating material is suitable for use as a splice cap. It is therefore necessary that the sleeve be covered by insulating material, and in many instances it is desirable that the splice cap cover or insulator be assembled on the splice cap before the crimping is done. One advantage to be gained by preassembling the cap and the insulator at the factory lies in the fact that the number of separate pieces which must be handled in the field is reduced. The assembly of splice cap and insulator is what is known as a preinsulated splice cap.

Many preinsulated splice caps have been proposed, but for one reason or another none has been entirely satisfactory. Often the deficiency has been that in making the crimp the insulator is punctured, thus exposing the underlying splice cap and thus at least partially rendering the insulator ineffective.

This invention provides a preinsulated splice cap which is not subject to the deficiencies of the prior art devices, which is foolproof and safe, which is of simple construction, which is easily applied in the field without special tools (except for a crimping tool), and which is easily made.

Accordingly important objects of the invention are to provide a preinsulated splice cap having the advantages set forth above.

The invention contemplates a preinsulated splice cap which includes a splice cap cover or insulator, a splice cap within the cover and an outer body, the insulator having a first portion within the body and a second portion initially outside the body, so that the cap be deformed to join together a plurality of conductors therein by force applied through the second portion of the insulator and then the body can be moved to cover the second portion.

The above and other objects and advantages will become evident from the following description of a preferred embodiment of the invention and the accompanying drawings thereof in which.

Figure 1:
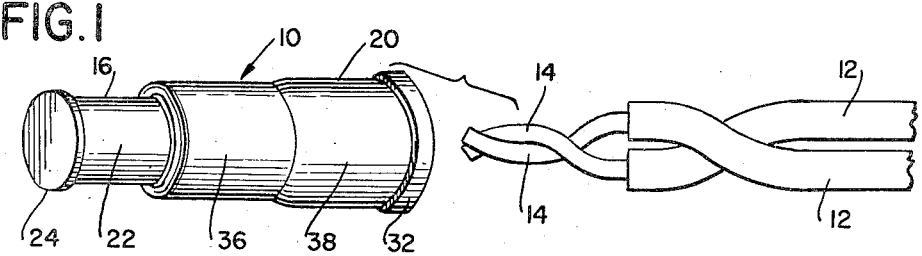
Fig. 1 is a perspective view of a preinsulated splice cap in accordance with the invention and a plurality of insulated wires from the ends of which the insulation has been stripped for a predetermined distance to expose the conductors which have been twisted together and which are about to be inserted into the preinsulated splice cap.

Reference is now made to the drawings which show a preinsulated splice cap 10 for electrically and mechanically connecting a plurality of insulated wires 12 (two being shown) from one end of each of which the insulation has been removed for a predetermined distance to expose electrical conductors 14 which are twisted together as shown. Conductors 14 may be solid or stranded. As shown they are solid.

Preinsulated splice cap 10 comprises a splice cap cover or insulator 16, a splice cap 18 (Figs. 2 and 3) and an outer body 20.

Figure 4:
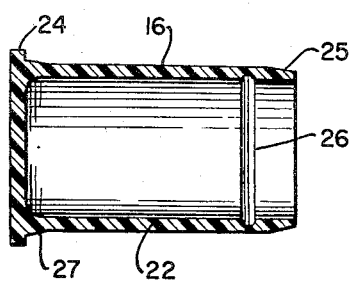
Fig. 4 is a view showing in longitudinal section the splice cap cover by itself.

Insulator 16 is of insulating material which is resiliently stretchable within limits. A preferred example is nylon. The construction of insulator 16 can best be understood from Fig. 4 which shows that part by itself. Insulator 16 includes a tubular portion 22 having an open end, a closed end which preferably has an external flange 24, an outer surface which is cylindrical except at its ends and an inner cylindrical surface having a circumferential recess 26 spaced from the closed end of insulator 16. The outer surface of portion 22 is chamfered as shown at 25 at its open end and is desirably but not necessarily tapered as shown at 27 adjacent to flange 24 to be of greater diameter at flange 24 than at its location of merger with the cylindrical portion of the outer surface. Chamfer 25 does not overlap recess 26.

Figure 2:
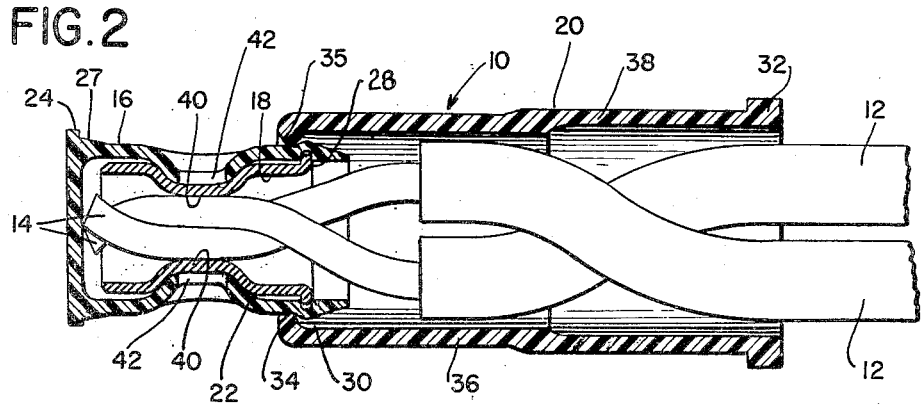
Fig. 2 is a view showing the preinsulated splice cap of Fig. 1 in longitudinal section with the conductors therein after the crimping has been performed.
Figure 3:
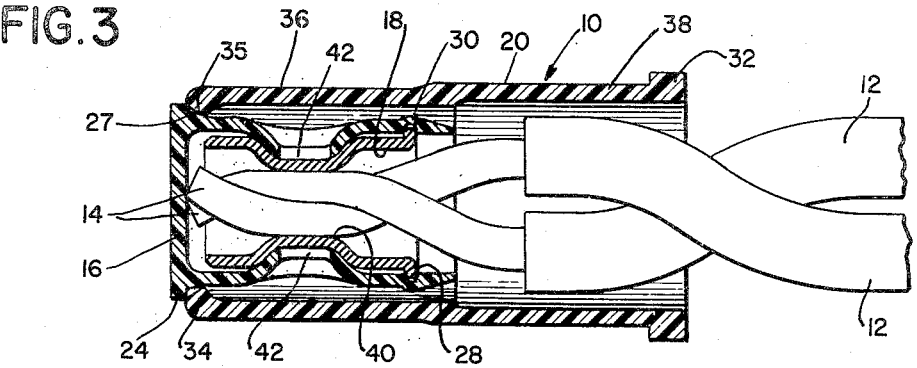
Fig. 3 is a view similar to Fig. 2 but showing the parts in their final positions.

As shown in Figs. 2 and 3, splice cap 18, which is of electrically conductive, malleable material, a satisfactory example of which is copper, is of tubular shape having an external circumferential flange 28 at one end which is open. The other end of cap 18 is as shown also open, but it could be closed.

Splice cap 18 and insulator 16 are permanently assembled with flange 28 of the former in recess 26 of the latter and the remainder of cap 18 located between recess 26 and the closed end of insulator 16, as shown (after a later operation) in Figs. 2 and 3.

The assembly of cap 18 and insulator 16 can be accomplished in any suitable manner, one example of which involves the use of a punch press.

Furthermore, the relative dimensions of flange 28 and recess 26 are such that the assembly of insulator 16 and cap 18 is accompanied by a stretching of the material of insulator 16, resulting in an increased outside diameter of insulator 16 in the vicinity of recess 26 and giving rise to a circumferential bulge as shown at 30 in Figs. 2 and 3. Bulge 30 can be achieved in other ways.

Body 20, which is also of insulating material resiliently stretchable within limits, a preferred example of which is nylon, is of tubular shape open at both ends, one of which is provided with an external circumferential stiffening flange 32 and the other of which has an internal circumferential flange 34 preferably having a relief 35 as shown. Although body 20 is preferably of one-piece molded construction, it is provided with two coaxial longitudinal portions 36 and 38 which merge at the approximate longitudinal middle of body 20. The former extends therefrom to flange 34 and the latter to flange 32.

The inside diameter of flange 34 is normally slightly less than the diameter of the cylindrical portion of the outer surface of insulator 16 but is greater than the diameter of chamfer 25 at its free end. The inside diameter of portion 36 of body 20 is as shown but not necessarily greater than the maximum diameter of bulge 30. The reasons for the relative dimensions set forth in this paragraph will be brought out shortly.

The sub-assembly of cap 18 and insulator 16 is assembled with body 20 by abutting chamfer 25 of insulator 16 against relief 35, with the free end of chamfer 25 within flange 34. The parts are then subjected to an axial squeeze in any suitable manner, causing bulge 30 temporarily to expand the inside diameter of flange 34 until bulge 30 passes therethrough and just enters portion 36. Because of the fact that the diameter of the cylindrical portion of the outer surface is normally greater than the inside diameter of flange 34, flange 34 does not return to its original size, but these parts engage each other with a frictional interfering fit. The parts are now positioned as shown in Fig. 2 and the fabrication of the illustrated example of preinsulated splice cap is complete. With the parts as shown in Fig. 2, bulge 30 prevents disassembly of insulator 16 and cover 20, and the frictional fit of insulator 16 and flange 34 prevents insulator 16 from accidentally entering cover 20 further. Furthermore, with the parts positioned as shown in Fig. 2 bulge 30 is adjacent to flange 34 so that a substantial portion of insulator 16 is exposed outside body 20.

To effect a connection of conductors 14 of wires 12 by means of the illustrated example of the invention, conductors 14 (twisted together as aforesaid) are inserted into the end of body 20 having flange 32 and into insulator 16 and cap 18 until the ends of wires 14 abut the closed end of insulator 16. Cap 18 is then deformed as by crimping at circumferentially spaced locations 40 thus to secure cap 18 to wires 14 and to connect them electrically and mechanically.

The crimping is effected by force applied through the wall of insulator 16 which is deformed inwardly to follow the contour of crimped locations 40. The deformation of insulator 16 is of such severity as to pierce the material of insulator 16 is indicated at 42 at the crimped locations.

The pierced places 42 are then covered by applying a further axial squeeze to insulator 16 and cover 20, causing these parts to telescope together until flanges 24 and 34 abut each other and body 20 completely covers pierced places 42. The connection has now been completed and all parts are as shown in Fig. 3. The axial squeeze must be sufficient to overcome the frictional resistance occasioned by the interfering engagement of insulator 16 and flange 34. When taper 27 enters flange 34 the frictional resistance is increased to provide a final lock of the parts in the position shown in Fig. 3. Furthermore the engagement of taper 27 and flange 34 assures that there will be no air gap therebetween thus eliminating a possible leakage path.

In use the connection will ordinarily not be subjected to sufficient force to overcome the interference between taper 27 and flange 34 to cause the parts to move once again to the positions shown in Fig. 3 again to expose pierced places 42.

The illustrated preinsulated splice cap is well suited to attain the objects and advantages specifically stated above and others.

Many changes which will occur to those skilled in the art can be made without departing from the invention. The illustrated details are accordingly not to be taken as limitations upon the invention except as the details are included in the appended claims.

I claim:
1. A preinsulated splice cap assembly comprising first and second insulating members, said first member having a closed end, an open end and a deformable portion therebetween and further having a first position with respect to said second member in which said open end is within said second member and said closed end and said deformable portion are outside of said second member and a second position with respect to said second member in which said second member covers said portion, and a splice cap fixed with respect to said first member and deformable by force transmitted thereto through said first member when said first member is in said first position.

2. A preinsulated splice cap assembly comprising inner and outer interengaging tubular insulating members, said inner member having a closed end, an open end and a deformable portion therebetween and further having a first position with respect to said outer member in which said open end is within said outer member and said closed end and said deformable portion are outside of said outer member and a second position with respect to said outer member in which said outer member covers said portion, and a tubular splice cap in said inner member and deformable by force transmitted thereto through said portion when said inner member is in said first position.

3. A preinsulated splice cap assembly comprising inner and outer interengaging tubular insulating members, said inner member having a closed end, an open end and a deformable portion therebetween and further having a first position with respect to said outer member in which said open end is within said outer member and said closed end and said deformable portion are outside of said outer member and a second position with respect to said outer member in which said outer member covers said portion, said inner member being movable from said first to said second position and adapted to engage said outer member with a frictional fit in each said position, and a tubular splice cap in said inner member and deformable by force transmitted thereto through said portion when said inner member is in said first position.

4. A preinsulated splice cap assembly comprising a tubular body, a tubular insulator having a closed end, an open end and a deformable portion therebetween and further having a first position with respect to said body in which said open end is within said body and said closed end and said deformable portion are outside of said body and a second position with respect to said body in which said deformable portion is inside of said body, and a splice cap in said insulator and movable therewith, so that said cap can be deformed to join conductors therein by force applied to said cap through said deformable portion with said insulator in said first position and then said insulator can be moved to said second position.

5. A preinsulated splice cap assembly comprising inner and outer interengaging tubular insulating members, said inner member having a closed end, an open end and a deformable portion therebetween and further having a first terminal position with respect to said outer member in which said open end is within said outer member and said closed end and said deformable portion are outside of outer said member and a frictional fit exists between said members and a second terminal position with respect to said outer member in which said outer member covers said deformable portion and a frictional fit exists between said members, said inner member being movable from said first to said second position, a frictional fit existing between said members in all positions of said inner member intermediate said terminal positions, and a tubular splice cap in said inner member and deformable by force applied thereto through said deformable portion when said inner member is in said first position.

6. A preinsulated splice cap assembly comprising a tubular insulator having a closed end, an open end and a deformable portion therebetween and at least a part of the outer surface of said insulator being cylindrical, a splice cap in said insulator and an insulating tubular body having an open end and an internal circumferential flange adjacent to said open end, said insulator having a first position with respect to said body in which said open end is within said body and said closed end and said deformable portion are outside of said body and the cylindrical part of the outer surface of said insulator engages said flange with a frictional fit and a second position with respect to said body in which said deformable portion is inside said insulator and the outer surface of said insulator engages said flange with a frictional fit, so that said cap can be deformed to join conductors therein by force applied to said deformable portion with said insulator in said first position and then said insulator can be moved to said second position.

7. A preinsulated splice cap assembly comprising a tubular insulator having a closed end, an open end and a deformable portion therebetween and at least a part of the outer surface of said insulator being cylindrical, a splice cap in said insulator and an insulating tubular body having an open end and an internal circumferential flange adjacent to said open end, said insulator having a first position with respect to said body in which said open end is within said body and said closed end and said deformable portion are outside of said body and the cylindrical part of the outer surface of said insulator is within and engages said flange with a frictional fit and a second position with respect to said body in which said deformable portion is inside said insulator and the outer surface of said insulator engages said flange with a greater frictional fit, so that said cap can be deformed to join conductors therein by force applied to said deformable portion with said insulator in said first position and then said insulator can be moved to said second position.

8. A preinsulated splice cap assembly comprising a tubular insulator having a closed end, an open end and an outer surface having a cylindrical portion spaced from said closed end and a frusto-conical portion between said cylindrical portion and said closed end of smallest diameter adjacent to said cylindrical portion, a splice cap in said insulator and an insulating tubular body having an open end and an internal circumferential flange adjacent to said open end and of diameter normally smaller than that of said cylindrical portion, said insulator having a first position with respect to said body in which said cylindrical portion engages said flange with a first frictional fit providing a predetermined resistance to relative movement of said insulator and said body, and a second position with respect to said body in which said frusto-conical portion engages said flange with a second frictional fit providing greater resistance to relative movement of said insulator and said body, so that said cap can be deformed to join conductors therein by force applied through said insulator when said insulator is in said first position and then said insulator can be moved to said second position.

9. A preinsulated splice cap assembly comprising a tubular insulator having a closed end, an open end and a deformable portion therebetween, the outer surface of said insulator having a cylindrical first portion and a second portion of greater diameter than said first portion between said first portion and said open end, a splice cap in said insulator, and a tubular insulating body having an open end, a cylindrical inner surface of greater diameter than said cylindrical portion and an internal circumferential flange between the open end of said body and said cylindrical surface and of smaller diameter than said cylindrical surface, said insulator having a first position with respect to said body in which said second portion is within said cylindrical surface and a part of said cylindrical first portion is within and engages said flange with a fritcional fit and said closed end and said deformable portion are outside said body, and a second position with respect to said body in which substantially more of said insulator is inside said body, so that said cap can be deformed to join conductors therein by force applied through said insulator with said insulator in said first position and then said frictional fit can be overcome to move said insulator to said second position.

10. A preinsulated splice cap assembly comprising an insulator having a closed end, an open end and a deformable portion therebetween, said insulator having an external surface having an annular part in said deformable portion and an additional part between said annular part and said open end, said additional part bulged with respect to said annular part, a splice cap in said insulator, and a tubular insulating body having an open end and in internal flange frictionally engaging said annular part of said external surface, said insulator having a first position with respect to said body in which said deformable portion is outside said body and a second position with respect to said body in which said deformable portion is within said body, so that said cap can be deformed to join conductors therein by force applied through said insulator with said insulator in said first position whereupon said insulator is movable to said second position.

References Cited in the file of this patent

UNITED STATES PATENTS

| Number | Name | Date |
|---|---|---|
| 743,346 | Swain | Nov. 3, 1903 |
| 2,021,701 | Smith | Nov. 19, 1935 |
| 2,173,668 | Smith | Sept. 19, 1939 |
| 2,314,884 | Klein | Mar. 30, 1943 |
| 2,429,585 | Rogoff | Oct. 21, 1947 |
| 2,618,684 | Bergan | Nov. 18, 1952 |
| 2,701,273 | Badeau | Feb. 1, 1955 |
| 2,748,186 | Lee | May 29, 1956 |
| 2,792,444 | Bergan | May 14, 1957 |